United States Patent
Martin et al.

(10) Patent No.: US 10,452,564 B2
(45) Date of Patent: Oct. 22, 2019

(54) FORMAT PRESERVING ENCRYPTION OF OBJECT CODE

(71) Applicant: EntIT Software LLC, Sunnyvale, CA (US)

(72) Inventors: Luther Martin, San Jose, CA (US); Timothy Roake, Palo Alto, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 163 days.

(21) Appl. No.: 15/496,287

(22) Filed: Apr. 25, 2017

(65) Prior Publication Data
US 2018/0309569 A1   Oct. 25, 2018

(51) Int. Cl.
| G06F 21/12 | (2013.01) |
| G06F 12/14 | (2006.01) |
| H04L 9/08  | (2006.01) |
| H04L 9/32  | (2006.01) |

(52) U.S. Cl.
CPC .......... *G06F 12/1408* (2013.01); *H04L 9/088* (2013.01); *H04L 9/3239* (2013.01); *G06F 2212/1052* (2013.01); *H04L 2209/38* (2013.01)

(58) Field of Classification Search
CPC . H04L 63/0428; H04L 63/0435; H04L 63/12; G06F 21/10; G06F 21/12; G06F 21/121; G06F 21/125; G06F 21/14
See application file for complete search history.

(56) References Cited

U.S. PATENT DOCUMENTS

| 5,603,047 A * | 2/1997 | Caulk, Jr. ............. G06F 9/3001 712/23 |
| 7,685,214 B2 | 3/2010 | Chen et al. |
| 8,151,110 B2 | 4/2012 | Vantalon et al. |
| 8,948,376 B2 | 2/2015 | Hoover |
| 9,177,111 B1* | 11/2015 | Squires .................. G06F 21/71 |
| 9,202,079 B2 | 12/2015 | Kaliski |
| 9,208,491 B2 | 12/2015 | Spies et al. |

(Continued)

FOREIGN PATENT DOCUMENTS

| JP | 2006025436 | 1/2006 |

OTHER PUBLICATIONS

Luther Martin, U.S. Appl. No. 15/496,282 entitled Format Preserving Encryption of Floating Point Data filed Apr. 25, 2017 (21 pages).

(Continued)

*Primary Examiner* — Eric W Shepperd

(57) ABSTRACT

Format preserving encryption of object code is disclosed. One example is a system including at least one processor and a memory storing instructions executable by the at least one processor to identify object code to be secured, where the object code comprises a list of instructions, each instruction comprising an opcode and zero or more parameters. A format preserving encryption (FPE) is applied to the received object code, where the FPE is applied separately to a sub-plurality of instructions in the list of instructions, to generate an encrypted object code comprising a sub-plurality of encrypted instructions. An encrypted object code is provided to a service provider, where the encrypted object code comprises the sub-plurality of encrypted instructions, and any unencrypted portions of the object code.

18 Claims, 3 Drawing Sheets

(56) References Cited

U.S. PATENT DOCUMENTS

| | | | |
|---|---|---|---|
| 9,436,525 | B2 | 9/2016 | Illowsky et al. |
| 9,582,332 | B2* | 2/2017 | Hiremane ............ G06F 9/5044 |
| 9,635,011 | B1 | 4/2017 | Wu |
| 2006/0242702 | A1* | 10/2006 | McIntosh ............. G06F 9/3802 |
| | | | 726/22 |
| 2010/0211781 | A1* | 8/2010 | Auradkar ............ G06F 21/6209 |
| | | | 713/168 |
| 2011/0022854 | A1* | 1/2011 | Macchetti ............ G06F 21/125 |
| | | | 713/190 |
| 2011/0103579 | A1 | 5/2011 | Martin |
| 2011/0280394 | A1* | 11/2011 | Hoover ................. H04L 9/0625 |
| | | | 380/28 |
| 2011/0307961 | A1* | 12/2011 | de Perthuis ......... G06F 9/30145 |
| | | | 726/26 |
| 2013/0007467 | A1 | 1/2013 | Chan et al. |
| 2013/0168450 | A1 | 7/2013 | von Mueller et al. |
| 2013/0232578 | A1 | 9/2013 | Chevallier-Mames et al. |
| 2014/0229742 | A1 | 8/2014 | Heen et al. |
| 2015/0186296 | A1* | 7/2015 | Guidry ................... G06F 21/54 |
| | | | 713/193 |
| 2015/0326388 | A1 | 11/2015 | Sim et al. |
| 2016/0006703 | A1 | 1/2016 | Boivie et al. |
| 2016/0182543 | A1 | 6/2016 | Aabye et al. |
| 2017/0177504 | A1* | 6/2017 | Desai ................. G06F 9/30029 |

OTHER PUBLICATIONS

Luther Martin, U.S. Appl. No. 15/496,285 entitled Secure Representation Via a Format Preserving Hash Function filed Apr. 25, 2017 (24 pages).

Liu, X. et al., Privacy-preserving Outsourced Calculation on Floating Point Numbers, Jun. 27, 2016 (17 pages).

Kim, K. et al., Encoding of Korean Characters with Less Radix in Format-preserving Encryption, Dec. 17, 2015 (3 pages).

Bellare, M. et al., Format-preserving Encryption, 2009 (25 pages).

https://www.comforte.com/products/protect/securdps/securdps-password-protection/—Securdata is Now a Core Part of Securdps, Mar. 4, 2016 (4 pages).

https://www.voltage.com/technology/data-encryption/hpe-format-preserving-encryption/—Format-Preserving Encryption (FPE), DataMasking, Datatype Agnostic, Referential Integrity, HPE Security—Data Security, 2015 (5 pages).

Himangi, G., Code Protection and Obfuscation of net Software Using Crypto Obfuscator, Jul. 20, 2010 (6 pages).

Alghamdi et al; A Software Tool for Floating Point Interval Analysis with Improved Precision for Javascript-based Medical Applications; 2016 IEEE; pp. 659-662;Year: 2016.

Arnold; The Patriot Missile Failure; 1 page; Aug. 23, 2000.

DuBen et al; Benchmark Tests for Numerical Weather Forecasts on Inexact Hardware, American Meteorological Society; 2014, 21 pages;Year: 2014.

Dworkin, Morris, NIST Special Publication 800-38G, Recommendation for Block Cipher Modes of Operation: Methods for Format-Preserving Encryption, Mar. 2016 (28 pages).

IEEE Std 754-1985; ANSI, IEEE Standard for Binary Floating-Point Arithmetic; 20 pages;Year: 1985.

Kaplan et al; The Error in the Double Precision Representation of Julian Dates; AA Technical Note Feb. 2011; 4 pages;Year: 2011.

U.S. Appl. No. 15/496,282, Notice of Allowance dated Mar. 27, 2019, pp. 1-4 and attachments.

Wikipedia, MIPS instruction set dated on or before Mar. 24, 2017 (22 pages).

Xie et al;Fast Lossless Compression of Seismic Floating-Point Data,2009; IEEE pp. 235-238;Year: 2009.

* cited by examiner

FORMAT PRESERVING ENCRYPTION OF OBJECT CODE

BACKGROUND

Object code is used to execute instructions via a processor. In some instances, such object code is sensitive, and in need of protection.

BRIEF DESCRIPTION OF THE DRAWINGS

Some implementations of the present disclosure are described with respect to the following figures.

DETAILED DESCRIPTION

Figure 1:
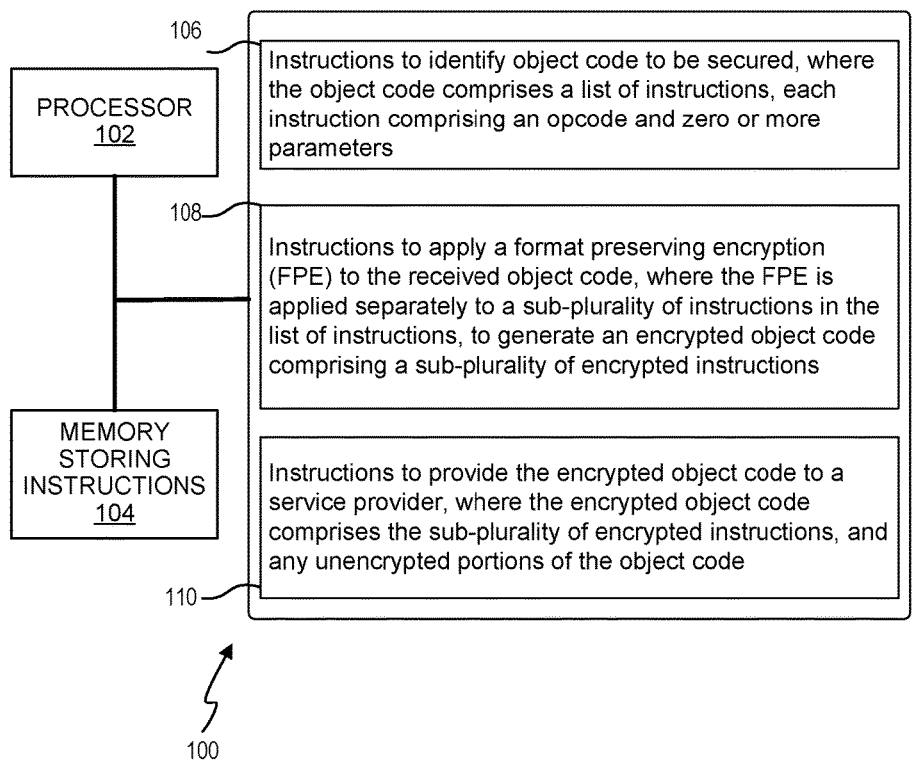
FIG. 1 is a block diagram illustrating one example of a system for format preserving encryption of object code.

Object code specifies executable instructions for a processor. Object code may be utilized to program a variety of computer-based applications. In many instances, such applications may be directed to handle sensitive data. Accordingly, any malicious manipulation of the instructions may result in an unauthorized access to sensitive data, cause applications to fail, and/or direct applications to perform in an unintended manner.

In many instances, object code may be protected via protocols that safeguard and protect the confidentiality of the sensitive code. Such additional protocols may require additional resources that may still be vulnerable to attack from hostile elements. Accordingly, there is a need to improve security of the object code with a minimal impact on businesses that must process such object code.

In some instances, it may be desirable to only permit authorized end-users to have the ability to execute the object code. Traditional methods may be utilized to prevent software from being reverse-engineered. However, such traditional methods often rely on techniques that are not cryptographically robust. Accordingly, there is a need to obfuscate the object code using cryptographically robust methods. Also, in order to maintain compatibility with existing object code processing systems, it is desirable to maintain the structure of the object code. Accordingly, format-preserving encryption may be applied to the object code, where the structure of the object code is preserved.

As described in various examples herein, format preserving encryption of object code is disclosed. One example is a system including at least one processor and a memory storing instructions executable by the at least one processor to identify object code to be secured, where the object code comprises a list of instructions, each instruction comprising an opcode and zero or more parameters. A format preserving encryption (FPE) is applied to the received object code, where the FPE is applied separately to a sub-plurality of instructions in the list of instructions, to generate an encrypted object code comprising a sub-plurality of encrypted instructions. An encrypted object code is provided to a service provider, where the encrypted object code comprises the sub-plurality of encrypted instructions, and any unencrypted portions of the object code.

As described herein, format preserving encryption of object code solves a problem necessarily rooted in technology. Executable object codes are ubiquitous. In many instances, such executable object code may be utilized to initiate, control, manage sensitive computer applications or otherwise transmit sensitive data. Executable object code may be manipulated, modified or otherwise hacked to alter its instructions. Such unauthorized activities directed at intercepting, modifying, misdirecting, and/or misusing such highly sensitive code need to be stopped. Accordingly, the techniques disclosed herein solve a technological problem of securing such sensitive object codes. In performing these security enhancements, the functioning of the computer is enhanced as well, since existing systems do not have to be modified to receive the encrypted object code, since its format is preserved during the encryption process. The technology described herein may be applied within large connected networks of computers, as for example, an enterprise system running a plethora of computer applications.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system 100 for format preserving encryption of object code. System 100 is shown to include a processor 102, and a memory 104 storing instructions 106-110 to perform various functions of the system.

The term "system" may be used to refer to a single computing device or multiple computing devices that communicate with each other (e.g. via a network) and operate together to provide a unified service. In some examples, the components of system 100 may communicate with one another over a network. As described herein, the network may be any wired or wireless network, including a network of cloud computing resources, and may include any number of hubs, routers, switches, cell towers, and so forth. Such a network may be, for example, part of a cellular network, part of the internet, part of an intranet, and/or any other type of network.

Memory 104 may store instructions 106 to identify object code to be secured, where the object code comprises a list of instructions, each instruction comprising an opcode and zero or more parameters. Generally, the code may be in structured form, and may need to be secured so as to prevent malicious use of the code. For example, object code comprises a sequence of instructions, each of which in turn may comprise a sequence starting with a valid opcode and continuing with zero or more parameters. An instruction may be represented as: OpCode, $Parm_1$, $Parm_2$, . . . , $Parm_n$, where "Parm" denotes a parameter value. In some examples, the instructions 106 may include instructions to parse the object code to identify the list of instructions, along with respective opcodes and respective parameters.

In some examples, the instructions 106 may include instructions to identify an instruction format for the list of instructions. For example, one format is a Microprocessor without Interlocked Pipelined Stages (MIPS) format which is a reduced instruction set computer (RISC) instruction set. The MIPS instruction set provides machine code where each instruction is 32 bits long. Generally, the instruction is given by an operation code (opcode) field.

In some examples, the instruction format may be one of an R-type, an I-type, and a J-type instruction. An I-type instruction is an immediate instruction, and a J-type instruction is a jump instruction. Also, for example, R-type instructions are register instructions. In R-type, the object code has a structure that resembles opcode, register, register, register, and shift. In some examples, the R-type instructions may include an additional parameter, a function value funct, that determines an exact operation to be performed.

Memory 104 may store instructions 108 to apply a format preserving encryption (FPE) to the received object code, where the FPE is applied separately to a sub-plurality of instructions in the list of instructions, to generate an encrypted object code comprising a sub-plurality of encrypted instructions. A format-preserving encryption function E may be applied to cryptographically obfuscate the list of instructions in a way that preserves their respective formats. For example, the function E may be applied to each instruction in turn, producing the sequence E(OpCode), E($Parm_1$), E($Parm_2$), . . . , E($Parm_n$), mapping the original opcode to another valid opcode, the original first parameter to another valid first parameter, and so forth. Determining the original object code from the encrypted source code may be as difficult as reversing the encryption operation E, which may be near impossible.

In some examples, the instructions 108 may include instructions to identify a sub-plurality of the list of instructions, where only the sub-plurality of the list of instructions needs to be secured. For example, certain instructions in the list of instructions may be directed to handling and/or processing sensitive information. Accordingly, these instructions may be encrypted, whereas the other instructions may be unencrypted.

As another example, some parameters may be representative of highly confidential data, and it may be necessary to secure such parameters. For example, for R-type instructions, a subset of all the fields may include sensitive information to be encrypted. For example, one or more registers, or the shift or the function value may be encrypted. Therefore, in some examples, it may be more cost effective to encrypt a portion of the object code.

Generally, as used herein, FPE is a mode of advanced encryption standard (AES) encryption. As an illustrative example, it may be an AES encryption as described by the NIST SP800-38G Standard and accepted by the PCI Security Standards Council (SSC) as strong encryption.

In some examples, the instructions 108 may include instructions to identify a computing architecture associated with the object code, and select the FPE to be compatible with the identified architecture. In some examples, system 100 may generate a call such as "FPE encrypt Intel instruction object code," or "FPE encrypt MIPS instruction object code," based on a computing architecture, where the call summons the correct encryption format that is compatible with the architecture.

Generally, the FPE may depend on the way the object code is parsed based on the specific architecture. In other words, the architecture may dictate the manner in which an instruction set is structured. In some examples, the FPE may depend on the encryption function, E, which may generally be selected based on the parsed object code. In some examples, the FPE may depend on a type of processor, and a class of opcode that is generated on the processor.

In some examples, the computing architecture may be based on processor speed, or connections between a central processing unit (CPU) and a memory. In some examples, the computing architecture may be a parallel or distributed architecture.

As an example, in systems related to the Internet of Things (IoT), the processor may be an Advanced RISC Machines (ARM) architecture. Also, for example, for desktop computers, the processor may be an Intel architecture.

In many instances, there are two general types of encryption algorithms—random and deterministic. In the case of a random algorithms, each encryption generates a different value. For example, when a name is encrypted, an encrypted output is generated along with a random (RAND) value that was used to encrypt the name. The RAND value may change each time an encryption algorithm is applied, so the encrypted output may vary each time the encryption algorithm is applied. To preserve a format and a referential integrity of a database where names are stored, non-random encryption is needed.

However, for a non-random encryption scheme, due to a lack of output variability, it may be possible to build a dictionary, and perform a table lookup to match the original name with the encrypted name. This would eliminate the need to decrypt. Accordingly, there is a need to introduce some randomness in a non-random encryption scheme. A tweak is a non-random value that may be used to give ciphertext variability. For example, in encrypting a hard disk, the encryption may be performed by mapping a sector to another sector, thereby preserving the format. In this example, the tweak may be a block number and sector number for the hard drive. Accordingly, upon application of an encryption algorithm, a different value may be obtained for a sector each time an encryption algorithm is applied to the sector. This provides a form of variability, while preserving the format.

A random value in a random encryption scheme is called an initialization vector (IV). A tweak is a way to use a non-random value to get the same property as when an IV is used. Although, a tweak is generally more complicated than an IV, the tweak provides the same type of security.

In some examples, the FPE may be deterministic, and the instructions 108 may include instructions to identify an offset into a file for each instruction of the list of instructions, and utilize the offset as a tweak for the deterministic encryption. By analogy to the hard disk example provided herein where the tweak is a block number and sector number, an object code has an offset into the file for each instruction. This non-random value may be utilized as the tweak.

Memory 104 may store instructions 110 to provide the encrypted object code to a service provider, where the encrypted object code comprises the sub-plurality of encrypted instructions, and any unencrypted portions of the object code. As described herein, when the format of the object code is preserved during encryption, substantial cost savings may be achieved since existing systems continue to process the object code without additional modifications. For example, storage of the code, transmission of the code, execution of the code, so forth may be based on a specific format of the object code. Such processing systems expect the object code to be in a form comprising a specific format. Accordingly, when the encrypted object code is provided in the same format, the systems may be agnostic to the transformation of the underlying code, and continue to process the code without changes in processor logic or other systems configurations. Accordingly, existing systems are able to process the output code since the format may be preserved.

In some examples, the instructions 110 may include instructions to receive a decryption key from the service provider, confirm validity of the decryption key, and enable the service provider to execute the object code based on the valid decryption key to be applied to the encrypted object code. For example, the service provider may include a cryptographic process that decrypts the encrypted object code with the help of a key, and then executes the decrypted or original object code. So the encrypted object code is a valid code, but may only be executed if the service provider has access to the key that was used encrypt the object code.

In some examples, the object code may be a smart contract in a blockchain, and the instructions 110 may include instructions to store the encrypted smart contract in the blockchain. A blockchain, as used herein, generally refers to a distributed database that maintains a dynamic linked list of online records that are called blocks. The blocks are timestamped and arranged in a linked chain. The record may be that of a financial transaction between parties, and the blockchain records such transactions in an open accessible and verifiable manner.

A smart contract is a digital contractual clause that may be embedded in a blockchain to facilitate a financial transaction. Since the smart contract is a computer protocol, it is comprised of executable object code. Also, financial transactions may be of a sensitive nature. Accordingly, the technology described herein may be applied to the smart contract to generate an encrypted smart contract, which is then embedded in the blockchain. This prevents unauthorized access and use of the smart contract. An authorized user may use a decryption key to unlock the encryption and execute the smart contract. As a result, privacy of a smart contract may be preserved while allowing the smart contract to be executed as needed.

Generally, the components of system 100 may include programming and/or physical networks to be communicatively linked to other components of each respective system. In some instances, the components of each system may include a processor and a memory, while programming code is stored on that memory and is executable by a processor to perform designated functions.

Generally, the system components may be communicatively linked to computing devices. A computing device, as used herein, may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. The computing device may include a processor and a computer-readable storage medium.

Figure 2:
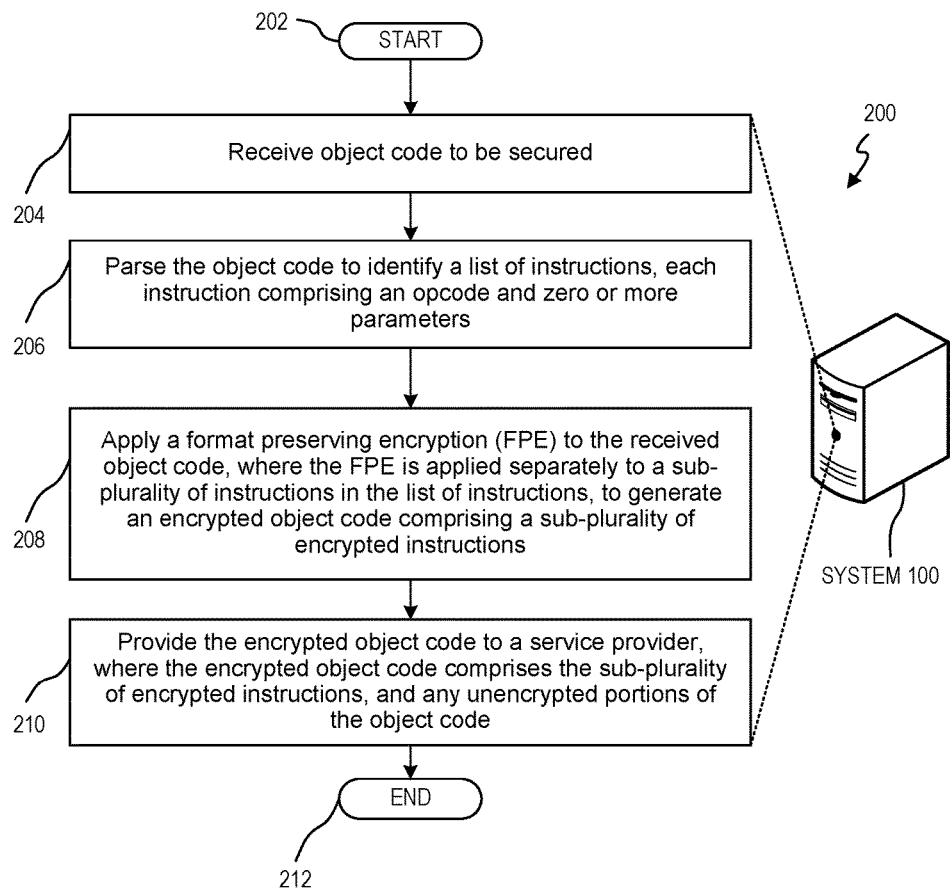
FIG. 2 is a flow diagram illustrating one example of a method for format preserving encryption of object code.

FIG. 2 is a flow diagram illustrating one example of a method for format preserving encryption of object code. In some examples, such an example method may be implemented by a system such as, for example, system 100 of FIG. 1. The method 200 may begin at block 202, and continue to end at block 212.

At 204, object code to be secured may be received.

At 206, the object code may be parsed to identify a list of instructions, where each instruction comprises an opcode and zero or more parameters.

At 208, a format preserving encryption (FPE) may be applied to the received object code, where the FPE is applied separately to a sub-plurality of instructions in the list of instructions, to generate an encrypted object code comprising a sub-plurality of encrypted instructions.

At 210, the encrypted object code may be provided to a service provider, where the encrypted object code comprises the sub-plurality of encrypted instructions, and any unencrypted portions of the object code.

In some examples, the method may include identifying an instruction format for the list of instructions.

In some examples, the method may include identifying a computing architecture associated with the object code, and selecting the FPE to be compatible with the identified architecture.

In some examples, the method may include receiving a decryption key from the service provider, confirming validity of the decryption key, and enabling the service provider to execute the object code based on the valid decryption key to be applied to the encrypted object code.

In some examples, the FPE is deterministic, and the method may include identifying an offset into a file for each instruction of the list of instructions, and utilizing the offset as a tweak for the deterministic encryption.

In some examples, the object code is a smart contract in a blockchain, and the method may include storing the encrypted smart contract in the blockchain.

Figure 3:
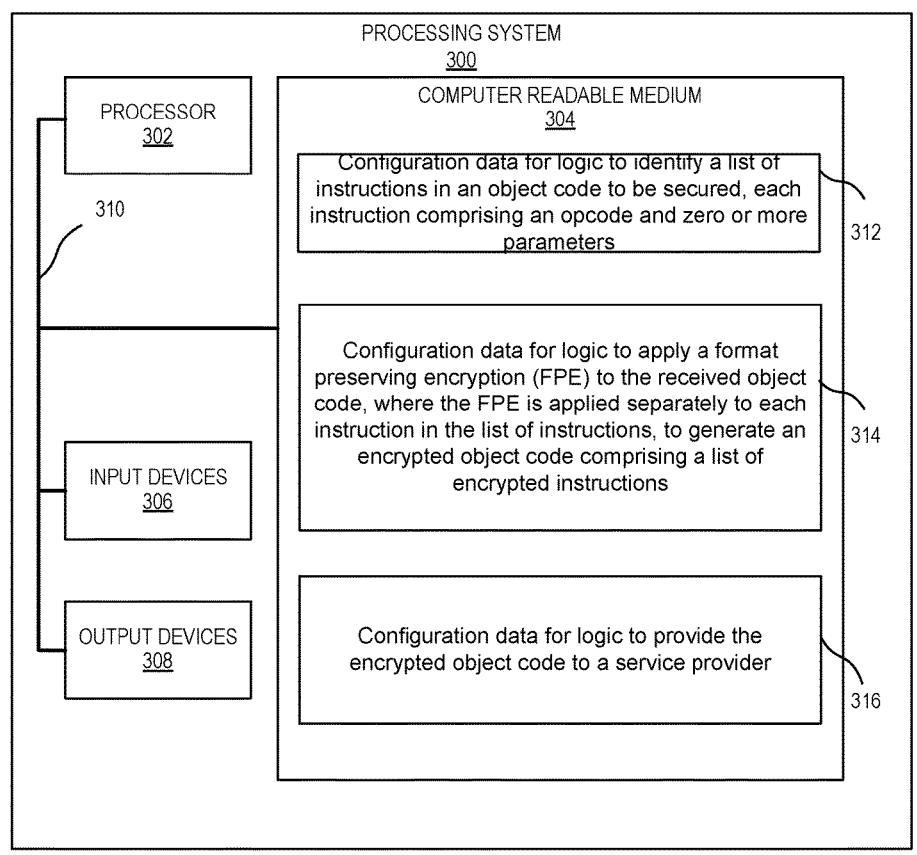
FIG. 3 is a block diagram illustrating one example of a computer readable medium for format preserving encryption of object code.

FIG. 3 is a block diagram illustrating one example of a computer readable medium for format preserving encryption of object code. Processing system 300 includes a processor 302, a computer readable medium 304, input devices 306, and output devices 308. Processor 302, computer readable medium 304, input devices 306, and output devices 308 are coupled to each other through a communication link (e.g., a bus). In some examples, the non-transitory, computer readable medium 304 may store configuration data for the logic to perform the various functions of the processor 302.

Processor 302 executes instructions included in the computer readable medium 304 that stores configuration data for logic to perform the various functions. Computer readable medium 304 stores configuration data for logic 312 to identify a list of instructions in an object code to be secured, each instruction comprising an opcode and zero or more parameters.

Computer readable medium 304 stores configuration data for logic 314 to apply a format preserving encryption (FPE) to the received object code, where the FPE is applied separately to each instruction in the list of instructions, to generate an encrypted object code comprising a list of encrypted instructions.

Computer readable medium 304 stores configuration data for logic 316 to provide the encrypted object code to a service provider.

In some examples, the computer readable medium 304 stores configuration data for logic to enable execution of the object code based on a valid decryption key to be applied to the encrypted object code.

In some examples, the FPE is deterministic, and the computer readable medium 304 stores configuration data for logic to identify an offset into a file for each instruction of the list of instructions, and utilize the offset as a tweak for the deterministic encryption.

In some examples, the object code is a smart contract in a blockchain, and the computer readable medium 304 stores configuration data for logic to store the encrypted smart contract in the blockchain.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, nonvolatile memory, flash memory, a storage drive (e.g., a hard drive), a solid state drive, and the like, or a combination thereof. For example, the computer readable medium 304 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage containers.

As described herein, various components of the processing system 300 are identified and refer to a combination of hardware and programming to perform a designated visualization function. As illustrated in FIG. 3, the programming may be processor executable instructions stored on tangible computer readable medium 304, and the hardware may include Processor 302 for executing those instructions. Thus, computer readable medium 304 may store program instructions that, when executed by Processor 302, implement the various components of the processing system 300.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 304 may be any of a number of memory components capable of storing instructions that can be executed by processor 302. Computer readable medium 304 may be non-transitory in the sense that it does not encompass a transitory signal but instead is made up of memory components to store the relevant instructions. Computer readable medium 304 may be implemented in a single device or distributed across devices. Likewise, processor 302 represents any number of processors capable of executing instructions stored by computer readable medium 304. Processor 302 may be integrated in a single device or distributed across devices. Further, computer readable medium 304 may be fully or partially integrated in the same device as processor 302 (as illustrated), or it may be separate but accessible to that device and processor 302. In some examples, computer readable medium 304 may be a machine-readable storage medium.

The general techniques described herein provide a way to apply format preserving encryption to an object code. One benefit of the techniques described herein is that the format of the object code is preserved during encryption. This makes it useful for the encrypted object code to be processed in many legacy environments.

Although specific examples have been illustrated and described herein, there may be a variety of alternate and/or equivalent implementations that may be substituted for the specific examples shown and described without departing from the scope of the present disclosure. This application is intended to cover any adaptations or variations of the specific examples discussed herein.

The invention claimed is:

1. A system comprising:
   at least one processor; and
   a non-transitory storage-medium storing instructions executable by the at least one processor to:
   identify object code to be secured, wherein the object code comprises a list of instructions, each instruction comprising an opcode and zero or more parameters;
   identify a computing architecture associated with the object code;
   select a format preserving encryption (FPE) to be compatible with the identified computing architecture;
   apply the FPE to the object code, wherein the FPE is applied separately to a sub-plurality of instructions in the list of instructions, to generate an encrypted object code comprising a sub-plurality of encrypted instructions; and
   provide the encrypted object code to a service provider, wherein the encrypted object code comprises the sub-plurality of encrypted instructions, and any unencrypted portions of the object code.

2. The system of claim 1, comprising further instructions to parse the object code to identify the list of instructions, along with respective opcodes and respective parameters.

3. The system of claim 1, comprising further instructions to identify an instruction format for the list of instructions.

4. The system of claim 3, wherein the instruction format is one of an R-type, an I-type, and a J-type instruction.

5. The system of claim 1, wherein the computing architecture is based on a processor speed, or connections between a central processing unit (CPU) and a memory.

6. The system of claim 1, wherein the computing architecture is a parallel or distributed architecture.

7. The system of claim 1, comprising further instructions executable by the at least one processor to:
   receive a decryption key from the service provider;
   confirm a validity of the decryption key; and
   enable the service provider to execute the object code based on the valid decryption key to be applied to the encrypted object code.

8. The system of claim 1, wherein the FPE is deterministic, and the system comprising further instructions executable by the at least one processor to:
   identify an offset into a file for each instruction of the list of instructions; and
   utilize the offset as a tweak for the deterministic FPE.

9. The system of claim 1, wherein the object code is a smart contract in a blockchain, and the system comprising further instructions executable by the at least one processor to store the encrypted smart contract in the blockchain.

10. A method performed by a system comprising a hardware processor, comprising:
    receiving object code to be secured;
    parsing the object code to identify a list of instructions, each instruction comprising an opcode and zero or more parameters;
    identifying an instruction format for the list of instructions, wherein the instruction format is one of an R-type, an I-type, and a J-type instruction;
    applying a format preserving encryption (FPE) to the received object code, wherein the FPE is applied separately to a sub-plurality of instructions in the list of instructions, to generate an encrypted object code comprising a sub-plurality of encrypted instructions; and
    providing the encrypted object code to a service provider, wherein the encrypted object code comprises the sub-plurality of encrypted instructions, and any unencrypted portions of the object code.

11. The method of claim 10, further comprising:
    identifying a computing architecture associated with the object code; and selecting the FPE to be compatible with the identified computing architecture.

12. The method of claim 10, further comprising:
receiving a decryption key from the service provider;
confirming a validity of the decryption key; and
enabling the service provider to execute the object code based on the valid decryption key to be applied to the encrypted object code.

13. The method of claim 10, wherein the FPE is deterministic, and the method further comprising:
identifying an offset into a file for each instruction of the list of instructions; and
utilizing the offset as a tweak for the deterministic FPE.

14. The method of claim 10, wherein the object code is a smart contract in a blockchain, and the method further comprising storing the encrypted smart contract in the blockchain.

15. A non-transitory computer readable medium comprising executable instructions to:
identify a list of instructions in an object code to be secured, each instruction in the list of instructions comprising an opcode and zero or more parameters;
apply a format preserving encryption (FPE) to the object code, wherein the FPE is applied separately to each instruction in the list of instructions, to generate an encrypted object code comprising a list of encrypted instructions;
provide the encrypted object code to a service provider; and enable execution of the object code based on a valid decryption key to be applied to the encrypted object code.

16. The non-transitory computer readable medium of claim 15, wherein the FPE is deterministic, and comprising further instructions to:
identify an offset into a file for each instruction of the list of instructions; and
utilize the offset as a tweak for the deterministic FPE.

17. The non-transitory computer readable medium of claim 15, comprising further instructions to:
identify an instruction format for the list of instructions, wherein the instruction format is one of an R-type, an I-type, and a J-type instruction.

18. A non-transitory computer readable medium comprising executable instructions to:
identify a list of instructions in an object code to be secured, each instruction in the list of instructions comprising an opcode and zero or more parameters, wherein the object code is a smart contract in a blockchain;
apply a format preserving encryption (FPE) to the object code, wherein the FPE is applied separately to each instruction in the list of instructions, to generate an encrypted smart contract comprising a list of encrypted instructions;
provide the encrypted smart contract to a service provider; and
store the encrypted smart contract in the blockchain.

* * * * *